(12) United States Patent
Graefe et al.

(10) Patent No.: US 11,003,193 B2
(45) Date of Patent: *May 11, 2021

(54) BROADCASTING MAP SEGMENTS FOR INDIVIDUALIZED MAPS

(71) Applicant: Intel Corporation, Santa Clara, CA (US)

(72) Inventors: Ralf Graefe, Haar (DE); Rafael Rosales, Feldkirchen Bavaria (DE); Rainer Makowitz, Munich (DE)

(73) Assignee: Intel Corporation, Santa Clara, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 15/857,975

(22) Filed: Dec. 29, 2017

(65) Prior Publication Data
US 2019/0041867 A1    Feb. 7, 2019

(51) Int. Cl.
| G05D 1/02 | (2020.01) |
| G08G 1/017 | (2006.01) |
| G08G 1/09 | (2006.01) |
| G08G 1/0967 | (2006.01) |
| G01C 21/00 | (2006.01) |
| G08G 1/01 | (2006.01) |

(52) U.S. Cl.
CPC .......... *G05D 1/0276* (2013.01); *G01C 21/00* (2013.01); *G05D 1/0287* (2013.01); *G08G 1/012* (2013.01); *G08G 1/017* (2013.01); *G08G 1/0112* (2013.01); *G08G 1/0116* (2013.01); *G08G 1/0141* (2013.01); *G08G 1/091* (2013.01);
(Continued)

(58) Field of Classification Search
CPC .... G05D 1/0276; G05D 1/0287; G01C 21/00; G08G 1/0112; G08G 1/0116; G08G 1/012; G08G 1/0141; G08G 1/017; G08G 1/091; G08G 1/096725; G08G 1/096741; G08G 1/096783
USPC ........................................................ 701/300
See application file for complete search history.

(56) References Cited

U.S. PATENT DOCUMENTS

| 10,330,480 B1 | 6/2019 | Krishnaswamy et al. |
| 2004/0073360 A1* | 4/2004 | Foxlin .................... G01C 21/16 701/517 |
| 2007/0233359 A1 | 10/2007 | Ferman et al. |

(Continued)

FOREIGN PATENT DOCUMENTS

| DE | 102016206631 A1 | 10/2017 |
| JP | 2011-191923 A | 9/2011 |
| KR | 10-20110-0091085 A | 8/2010 |

OTHER PUBLICATIONS

International Search Report and Written Opinion dated Mar. 15, 2019 for International Application No. PCT/US2018/062486, 12 pages.
(Continued)

*Primary Examiner* — Krishnan Ramesh
(74) *Attorney, Agent, or Firm* — Schwabe, Williamson & Wyatt, P.C.

(57) ABSTRACT

An embodiment of a semiconductor package apparatus may include technology to establish communication between a first stationary unit and one or more vehicles, combine sensor data from the first stationary unit and at least one source outside the first stationary unit, generate an environmental map based on the combined sensor data, divide the environmental map into two or more map segments, and broadcast the two or more map segments. Other embodiments are disclosed and claimed.

24 Claims, 14 Drawing Sheets

(52) U.S. Cl.
CPC . *G08G 1/096725* (2013.01); *G08G 1/096741* (2013.01); *G08G 1/096783* (2013.01)

(56) References Cited

U.S. PATENT DOCUMENTS

| | | | | |
|---|---|---|---|---|
| 2014/0039837 | A1* | 2/2014 | Hart | G06F 11/30 |
| | | | | 702/188 |
| 2014/0358436 | A1* | 12/2014 | Kim | B60W 30/12 |
| | | | | 701/532 |
| 2016/0212244 | A1 | 7/2016 | Stojanovski et al. | |
| 2017/0176998 | A1* | 6/2017 | Fechner | G01C 21/30 |
| 2018/0004213 | A1* | 1/2018 | Absmeier | G08G 1/096708 |
| 2018/0045521 | A1* | 2/2018 | Wege | G01C 21/206 |
| 2018/0113459 | A1 | 4/2018 | Bennie et al. | |
| 2018/0147721 | A1* | 5/2018 | Griffin | A47L 9/2889 |
| 2018/0154899 | A1* | 6/2018 | Tiwari | B60W 10/18 |
| 2018/0188039 | A1* | 7/2018 | Chen | G01C 21/3694 |
| 2018/0227973 | A1* | 8/2018 | Tsuboi | H04W 76/14 |
| 2018/0329428 | A1 | 11/2018 | Nagy et al. | |
| 2019/0120946 | A1* | 4/2019 | Wheeler | G01S 7/4972 |
| 2019/0323855 | A1* | 10/2019 | Mahler | G01S 7/003 |
| 2019/0389472 | A1 | 12/2019 | Zhang et al. | |
| 2020/0043343 | A1 | 2/2020 | Branson et al. | |

OTHER PUBLICATIONS

"Intelligent Transport Systems (ITS); Radiocommunications equipment operating in the 5 855 MHz to 5 925 MHz frequency band; Harmonised standard covering the essential requirements of article 3.2 of directive 2014/53/EU", etsi.org/deliver/etsi_en/302500_302599/302571/02.00.00_20/en_302571v020000a.pdf, Mar. 2016, 45 pages.
"Intelligent Transport Systems (ITS); Vehicular communications; Basic set of applications; Part 2: Specification of cooperative awareness basic service", etsi.org/deliver/etsi_en/302600_302699/30263702/01.03.02_60/en_30263702v010302p.pdf, Nov. 2014, 44 pages.
"Intelligent Transport Systems (ITS); Vehicular communications; Basic set of applications; Part 3: Specifications of decentralized environmental notification basic service", etsi.org/deliver/etsi_en/302600_302699/30263703/01.02.02_60/en_30263703v010202p.pdf, Nov. 2014, 73 pages.
Wikipedia, "IEEE 802.11p", en.wikipedia.org/wiki/IEEE_802.11p, retrieved on Oct. 23, 2017, 4 pages.
Li et al., "A multiple object tracking method using Kalman filter", International Conference on Information and Automation, 2010, 5 pages.
"Intelligent Transport Systems (ITS); Vehicular communications; Basic set of applications; Local dynamic map (LDM); Rationale for and guidance on standardization", etsi.org/deliver/etsi_tr/102800_102899/102863/01.01.01_60/tr_102863v010101p.pdf, Jun. 2011, 40 pages.
"The mobile broadband standard", 3gpp.org/release-14, retrieved on Oct. 23, 2017, 2 pages.
Office Action dated Jul. 23, 2020 for U.S. Appl. No. 16/368,231, 37 pages.
International Preliminary Report on Patentability for International Patent Application No. PCT/US2018/062486, 9 pages.

* cited by examiner

US 11,003,193 B2

BROADCASTING MAP SEGMENTS FOR INDIVIDUALIZED MAPS

TECHNICAL FIELD

Embodiments generally relate to autonomous vehicles. More particularly, embodiments relate to broadcasting map segments for individualized maps.

BACKGROUND

An autonomous or semi-autonomous vehicle (AV) may include various technologies for perception, such as camera feeds and sensory information. The European Technology Standards Institute (ETSI) publishes an Intelligent Transport Systems (ITS) standard which includes telematics and various types of communications in vehicles, between vehicles (e.g., car-to-car), and between vehicles and fixed locations (e.g., car-to-infrastructure). Dedicated short-range communications (DSRC) may provide communications between the vehicle and the roadside in specific locations (e.g., toll plazas for applications such as electronic fee collection). Cooperative-ITS (C-ITS) may support full autonomous driving including wireless short range communications (ITS-G5) dedicated to automotive ITS and road transport and traffic telematics (RTTT). C-ITS may provide connectivity between road participants and infrastructure.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
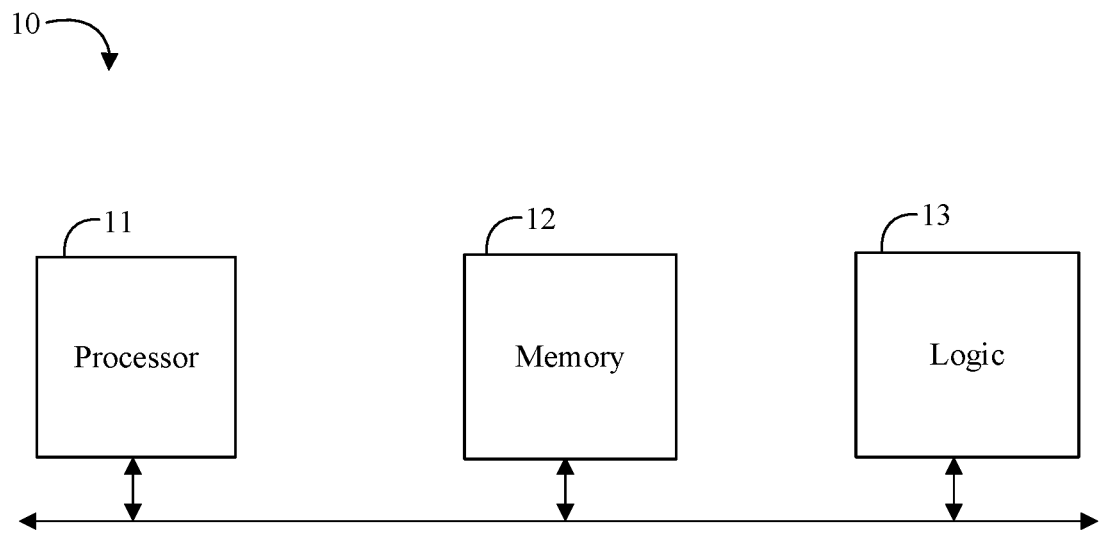
FIG. 1A is a block diagram of an example of an electronic processing system according to an embodiment.

Turning now to FIG. 1A, an embodiment of an electronic processing system 10 may include a processor 11, memory 12 communicatively coupled to the processor 11, and logic 13 communicatively coupled to the processor 11 to establish communication between a first stationary unit (e.g., a roadside infrastructure unit) and one or more vehicles, combine sensor data from the first stationary unit and at least one source outside the first stationary unit (e.g., roadside sensors, another stationary unit, the one or more vehicles, the cloud, etc.), generate an environmental map based on the combined sensor data, divide the environmental map into two or more map segments, and broadcast the two or more map segments. In some embodiments, the logic 13 may be further configured to establish communication between the first stationary unit and a second stationary unit with sidelink direct communication. In some embodiments, the logic 13 may also be configured to annotate the two or more map segments with information for the one or more vehicles to construct respective individualized environmental maps. For example, the logic 13 may be configured to assign a unique identifier to each of the one or more vehicles, and/or to assign a unique identifier to each of the two or more map segments corresponding to a location in the environmental map. In some embodiments, the logic 13 may be further configured to cluster the one or more vehicles into the two or more map segments based on respective locations of the one or more vehicles and respective locations of the two or more segments in the environmental map.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, establishing communication between a roadside unit and one or more vehicles, combining sensor data from the roadside unit and other roadside unit(s), generating an environmental map based on the combined sensor data, dividing the environmental map into two or more map segments, broadcasting the two or more map segments, etc.).

Figure 1B:
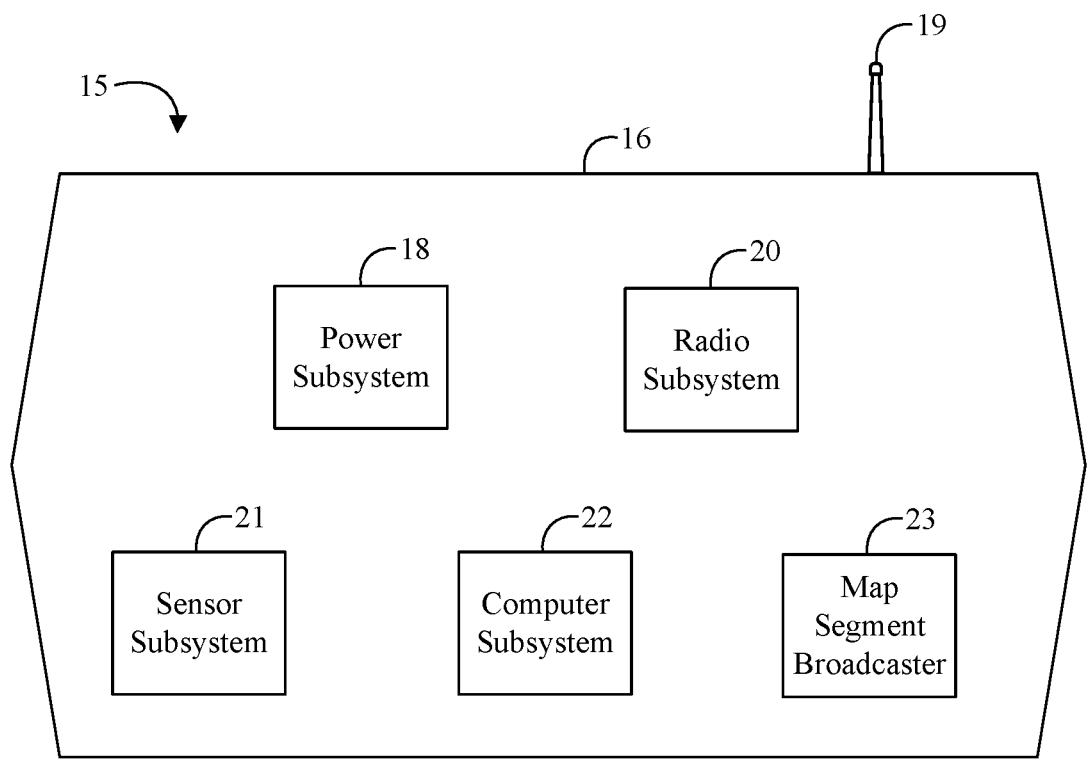
FIG. 1B is a block diagram of an example of a stationary unit according to an embodiment.

Turning now to FIG. 1B, an embodiment of a stationary unit 15 may include a housing 16 housing/enclosing a power subsystem 18. The stationary unit 15 may provision and/or support AVs which may be fully autonomous or semi-autonomous and may optionally accommodate one or more passengers and/or one or more drivers/pilots. The AVs may include propulsion subsystems which may include one or more of ground propulsion components, air propulsion components, marine propulsion components, and space propulsion components, or any other suitable propulsion components (e.g., cable, maglev, etc.). For example, an AV supported by the stationary unit 15 may be a car, a plane, a helicopter, a boat, a drone, etc. The power subsystem 18 may include one or more batteries or electrical power sources. In some embodiments, the power subsystem 18 may optionally include one or more additional power sources such as a gasoline or other fuel powered engine. The stationary unit 15 may also include one or more antennas 19 coupled a radio subsystem 20, a sensor subsystem 21, a computer subsystem 22, and a map segment broadcaster 23. The components and subsystems of the stationary 15 may be coupled to each in any suitable manner, including mechanically and/or electrically. Electrical components may be communicatively coupled to each other wired or wirelessly. In some embodiments, the stationary unit 15 may include technology to establish communication between the stationary unit 15 and another nearby stationary unit with sidelink direct communication.

The map segment broadcaster 23 may be configured as described in connection with the system 10 above (e.g., and/or may include features of the other embodiments described below). In particular, the map segment broadcaster 23 may include technology to establish communication between the stationary unit 15 (e.g., a roadside infrastructure unit) and one or more vehicles, combine sensor data from the sensor subsystem 21 inside the stationary unit 15 and at least one source outside the stationary unit 15 (e.g., roadside sensors, another stationary unit, the one or more vehicles, the cloud, etc.), generate an environmental map based on the combined sensor data, divide the environmental map into two or more map segments, and broadcast the two or more map segments with the radio subsystem 20. In some embodiments, the map segment broadcaster 23 may also be configured to annotate the two or more map segments with information for the one or more vehicles to construct respective individualized environmental maps. For example, the map segment broadcaster 23 may be configured to assign a unique identifier to each of the one or more vehicles, and/or to assign a unique identifier to each of the two or more map segments corresponding to a location in the environmental map. In some embodiments, the map segment broadcaster 23 may be further configured to cluster the one or more vehicles into the two or more map segments based on respective locations of the one or more vehicles and respective locations of the two or more segments in the environmental map. In some embodiments, the map segment broadcaster 23 may be physically or logically arranged as a module outside of the computer subsystem 22. Alternatively, in some embodiments all or portions of the map segment broadcaster 23 may be implemented in or integrated with the computer subsystem 22.

Figure 2:
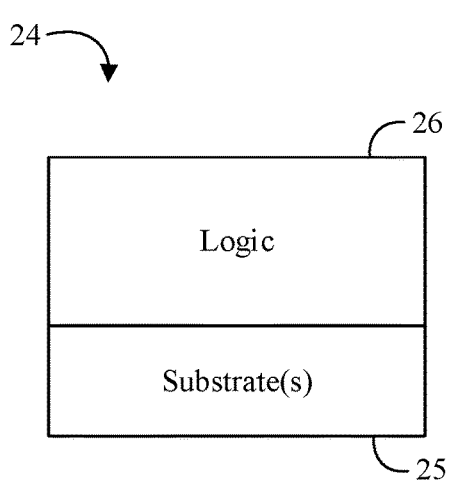
FIG. 2 is a block diagram of an example of a semiconductor package apparatus according to an embodiment.

Turning now to FIG. 2, an embodiment of a semiconductor package apparatus 24 may include one or more substrates 25, and logic 26 coupled to the one or more substrates 25, wherein the logic 26 is at least partly implemented in one or more of configurable logic and fixed-functionality hardware logic. The logic 26 coupled to the one or more substrates 25 may be configured to establish communication between a first stationary unit and one or more vehicles, combine sensor data from the first stationary unit and at least one source outside the first stationary unit, generate an environmental map based on the combined sensor data, divide the environmental map into two or more map segments, and broadcast the two or more map segments. In some embodiments, the logic 26 may be further configured to establish communication between the first stationary unit and a second stationary unit with sidelink direct communication. In some embodiments, the logic 26 may also be configured to annotate the two or more map segments with information for the one or more vehicles to construct respective individualized environmental maps. For example, the logic 26 may be configured to assign a unique identifier to each of the one or more vehicles, and/or to assign a unique identifier to each of the two or more map segments corresponding to a location in the environmental map. In some embodiments, the logic 26 may be further configured to cluster the one or more vehicles into the two or more map segments based on respective locations of the one or more vehicles and respective locations of the two or more segments in the environmental map. For example, the logic 26 coupled to the one or more substrates 25 may include transistor channel regions that are positioned within the one or more substrates 25.

Embodiments of logic 26, and other components of the apparatus 24, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 24 may implement one or more aspects of the method 30 (FIGS. 3A to 3C), the method 70 (FIG. 7), the method 100 (FIG. 10), or any of the embodiments discussed herein. The illustrated apparatus 24 includes one or more substrates 25 (e.g., silicon, sapphire, gallium arsenide) and logic 26 (e.g., transistor array and other integrated circuit/IC components) coupled to the substrate(s) 25. The logic 26 may be implemented at least partly in configurable logic or fixed-functionality logic hardware. In one example, the logic 26 may include transistor channel regions that are positioned (e.g., embedded) within the substrate(s) 25. Thus, the interface between the logic 26 and the substrate(s) 25 may not be an abrupt junction. The logic 26 may also be considered to include an epitaxial layer that is grown on an initial wafer of the substrate(s) 25.

Figure 3A:
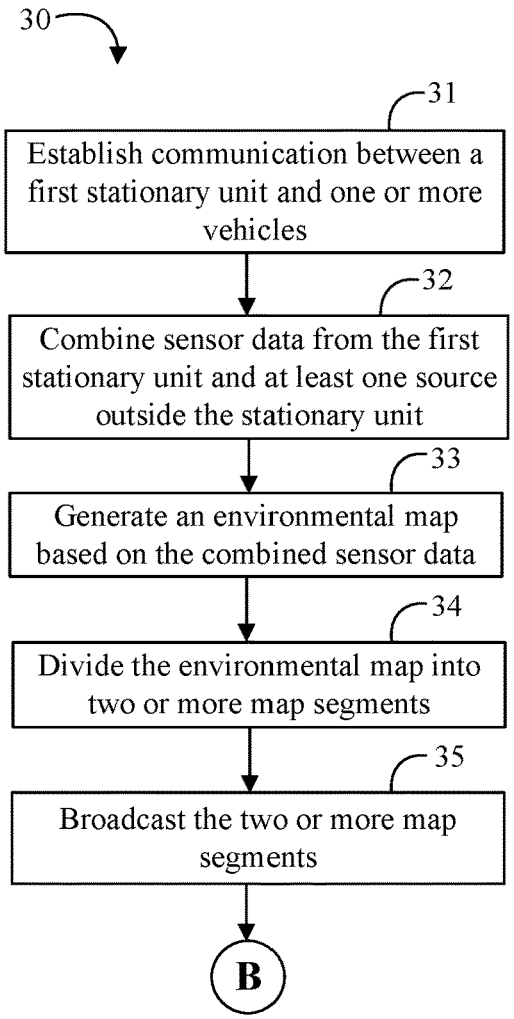
FIGS. 3A to 3C are flowcharts of an example of a method of communicating between a stationary unit and a vehicle according to an embodiment.
Figure 3B:
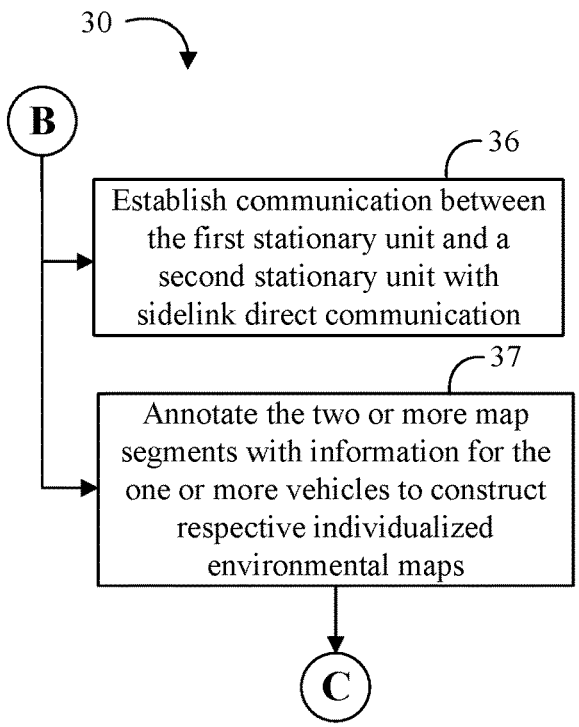
Figure 3C:
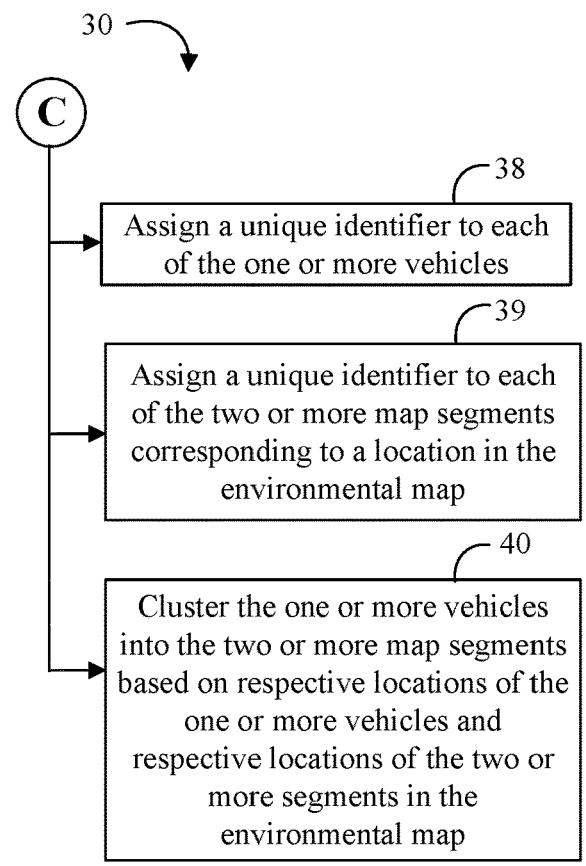

Turning now to FIGS. 3A to 3C, an embodiment of a method 30 of communicating between a stationary unit and a vehicle may include establishing communication between a first stationary unit and one or more vehicles at block 31, combining sensor data from the first stationary unit and at least one source outside the first stationary unit at block 32, generating an environmental map based on the combined sensor data at block 33, dividing the environmental map into two or more map segments at block 34, and broadcasting the two or more map segments at block 35. Some embodiments of the method 30 may further include establishing communication between the first stationary unit and a second stationary unit with sidelink direct communication at block 36. Some embodiments of the method 30 may further include annotating the two or more map segments with information for the one or more vehicles to construct respective individualized environmental maps at block 37. For example, the method 30 may include assigning a unique identifier to each of the one or more vehicles at block 38, and/or assigning a unique identifier to each of the two or more map segments corresponding to a location in the environmental map at block 39. Some embodiments of the method 30 may further include clustering the one or more vehicles into the two or more map segments based on respective locations of the one or more vehicles and respective locations of the two or more segments in the environmental map at block 40.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
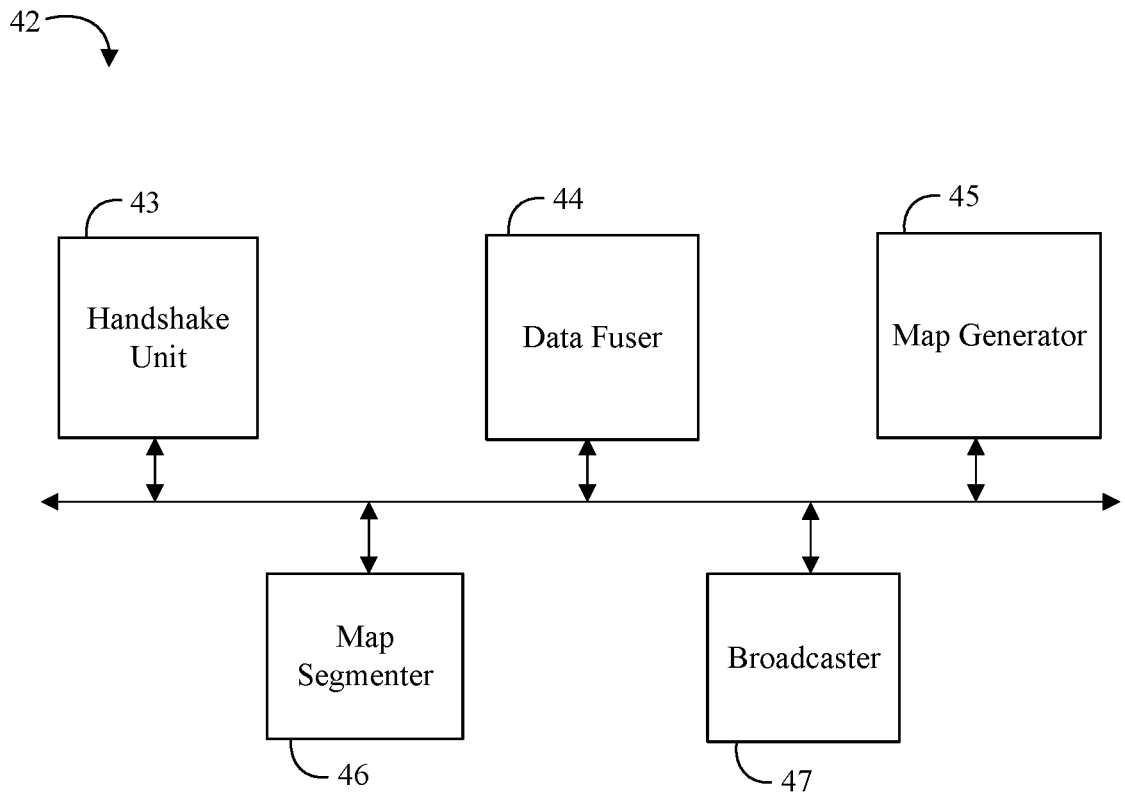
FIG. 4 is a block diagram of an example of map segment broadcaster according to an embodiment.

Turning now to FIG. 4, some embodiments may be physically or logically divided into one or more modules. For example, an embodiment of a map segment broadcaster 42 may include a handshake unit 43, a data fuser 44, a map generator 45, a map segmenter 46, and a broadcaster 47. The handshake unit 43 may include technology to establish communication between a roadside unit and one or more vehicles. The data fuser 44 may include technology to combine sensor data from the roadside unit, roadside sensors, the one or more vehicles, and/or at least one other roadside unit. The map generator 45 may include technology to generate an environmental map based on the combined sensor data from the data fuser 44. The map segmenter 46 may include technology to divide the environmental map from the map generator 45 into two or more map segments. The broadcaster 47 may include technology to broadcast the two or more map segments from the map segmenter 46. In some embodiments, the handshake unit 43 may be further configured to establish communication between the roadside unit and other roadside units with sidelink direct communication. In some embodiments, the map segmenter 46 may also be configured to annotate the two or more map segments with information for the one or more vehicles to construct respective individualized environmental maps. For example, the map segmenter 46 may be configured to assign a unique identifier to each of the one or more vehicles, and/or to assign a unique identifier to each of the two or more map segments corresponding to a location in the environmental map. In some embodiments, the map segmenter 46 may be further configured to cluster the one or more vehicles into the two or more map segments based on respective locations of the one or more vehicles and respective locations of the two or more segments in the environmental map.

Embodiments of the handshake unit 43, the data fuser 44, the map generator 45, the map segmenter 46, the broadcaster 47, and other components of the map segment broadcaster 42, may be implemented in hardware, software, or any combination thereof. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Some embodiments may advantageously provide a fog/edge infrastructure-aided dynamic mapping for autonomous driving and manufacturing (e.g., automated warehouses). For example, some embodiments may provide a platform to serve individualized maps of highly dynamic data for driving decisions in AVs. As used herein, autonomous may refer to either fully autonomous or partially autonomous. Real-time mapping of a highly dynamic environment may be important for high-reliability decision making systems. In the assisted/autonomous driving sector, for example, in-vehicle processing alone may be insufficient to form a sufficient or complete real-time object-detection and tracking map of the surrounding area. Some embodiments may advantageously provide an infrastructure (e.g., a roadside system) to augment in-vehicle processing for more complete map generation and object tracking.

Some embodiments may provide unique labeling of objects identified by infrastructural sensors, map segment tagging, and/or remote updates, together with a low overhead handshake protocol between the infrastructure and the vehicles. Some embodiments may provide an improved or optimum portion and detail of the high resolution map to each car to advantageously ensure complete coverage without requiring high additional processing load. Relevant performance indicators in the context of AVs may include completeness and absence of artifacts, precision, timeliness, and sufficient coverage distance (e.g., complete width of the road or production line). Improvement or optimization of these performance indicators in the vehicle alone may be limited, for example, where an AV may use sensor data acquired on board and may try to integrate the data in an environment model based on high resolution maps. For some other on-board only systems, for example, the radius of environmental perception may be limited due to a range limitation in sensor technology, obstacles like other vehicles, road bends, infrastructure, and/or weather conditions. The physical space for mounting sensors may be limited by aerodynamics and other design constraints. Adding sensors and/or additional compute power may add considerable weight, cost and energy consumption to each vehicle. Some embodiments may improve the generation of an individualized map for an AV by augmenting the local sensor data with broadcast data from a collaborative infrastructure. In the collaborative infrastructure, for example, the environmental model may also be based on a high resolution map but the collaborative infrastructure may use fixed sensors along the road. A global consistent environment model may be distributed to all participating vehicles. Advantageously, shifting more compute power to a roadside unit (RSU) together with roadside sensors may reduce the need for more powerful/complex sensors and/or compute capability in the AV.

Any suitable wireless technology and/or standards may be utilized for various aspects of some embodiments. Several standards support transmitting information directly between cars or between cars and infrastructure (e.g., DSRC, Cellular V2X, etc.) Standards such as the ETSI ITS standard family describe an infrastructure that supports the exchange of traffic related message using cooperative awareness message (CAM) and decentralized environment notification message (DENM) messages. CAM and DENM messages may provide information on road hazard or abnormal traffic conditions. CAM messages may also include high frequency data. Both message types may be stored and served from a local dynamic map (LDM) database. V2X standards may also provide lower level network protocols for direct communication between cars and other cars or infrastructure. In some other systems, RSUs may have limited compute power and may mostly be used as pure communication links between cars and cloud applications (e.g., acting as a network connection point between traffic participants and infrastructure components). Advantageously, an RSU in accordance with some embodiments may provide high performance hardware and/or software to serve highly dynamic car information.

Some other ETSI ITS-based systems may provide a single message per car that may contain high frequency information about location, speed, direction, etc. of each car. From these messages, a subscriber application may still need to create an overall map containing all cars in its vicinity. Unfortunately, the information provided may not be complete or timely because the AV may receive the information from a heterogeneous environment from vehicles of different standards/manufacturers where the source of location and time sync information may be unclear. Furthermore, some vehicles may not be equipped to provide any information. Advantageously, some embodiments may provide sensor fusion, object annotation, and individualizable map segments for environmental models for AVs in the infrastructure. In some embodiments, object annotation may be facilitated by a handshake protocol between vehicles and infrastructure at road sector entry only, where each car may receive a system-wide identifier. For example, a sector may refer to a portion of the road that is covered by the sensors connected to one compute unit (e.g., one RSU). In some embodiments, communication of the environment model from the infrastructure to the AVs may be broadcast-only to improve dependability and latency, and may improve or optimize the utilized communication capacity. Continuity of sensoric range may be derived from a wireless communication range overlap between infrastructure sectors. In some embodiments, wireless communication between infrastructure may use sidelink direct communication to deliberately limit transmission range per sector. The environmental model may be represented as a highly dynamic map which may be divided into segments and broadcast to the AVs. For example, a segment may refer to a portion of the created environmental map (e.g., a compute unit for a sector may create several map segments). The segments received by an AV may be concatenated by the AV to achieve improved or optimal visibility range while staying consistent with the overall map.

Advantageously, having the AV utilize the broadcast segments may save compute capacity in the AV for doing its own sensor fusion and object detection. For example, embodiments of the infrastructure-based support for automated driving may be used by AVs with basic sensor and compute power and enable the AVs to use level 4 or 5 automated driving. Embodiments of the infrastructure-based support may also be used by high end AVs to complement their own sensor data/compute ability. Some embodiments may help close a gap in the communication chain for traffic management systems from the AV over roadside infrastructure and mobile networks into the cloud.

Figure 5:
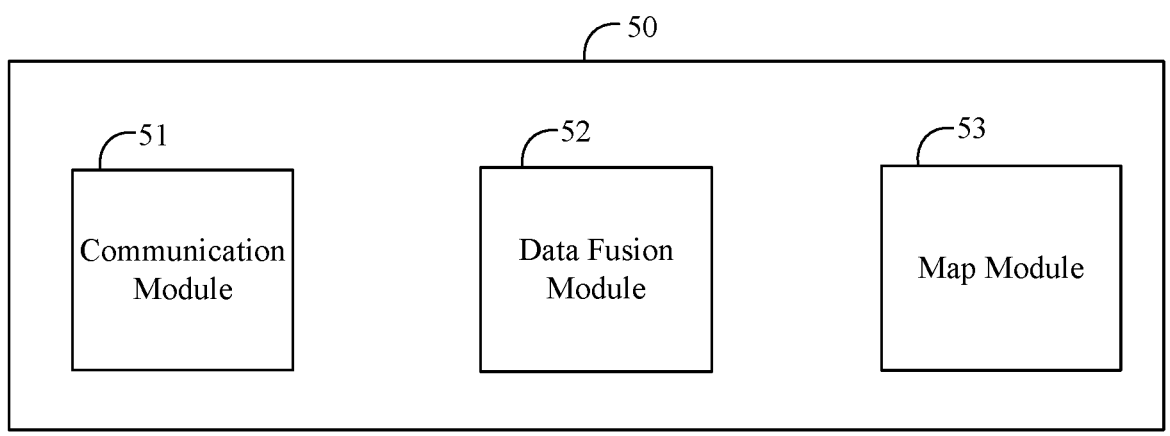
FIG. 5 is a block diagram of an example of roadside unit according to an embodiment.

Turning now to FIG. 5, a stationary RSU 50 may include a communication module 51, a data fusion module 52, and a map module 53. The communication module 51 may include any suitable radio devices to communicate utilizing any suitable wireless standard. For example, the communication module 51 may include technology to support a handshake between the RSU 50, AVs, and other infrastructure (e.g., other stationary RSUs, the cloud, etc.). For example, the RSU 50 may be communicatively coupled (e.g., wired, wirelessly, or a hybrid combination thereof) to a variety of data sources including roadside sensors, AVs, and/or cloud services (e.g., traffic, weather, emergency services, alerts, etc.). The data fusion module 52 may include technology to perform sensor detection and/or data collection and may combine/process the data to prepare the data for map generation. The map module 53 may include technology to generate an overall environmental map based on the information from the data fusion module 52. The map module 53 may also be configured to generate map segments from the overall environmental maps. The communication module 51 may include technology to broadcast the map segments to the AVs, which may then generate individualized maps based on the received map segments to help the AV navigate. Advantageously, the environmental map may be created by the RSU 50 in a roadside infrastructure. The car or AV may merely be a user of the system and as such may need only to have the capability to establish a mobile communication link with the infrastructure. While some embodiments may be most beneficial to self-driving cars, embodiments may also be used by other types of vehicles.

Figure 6:
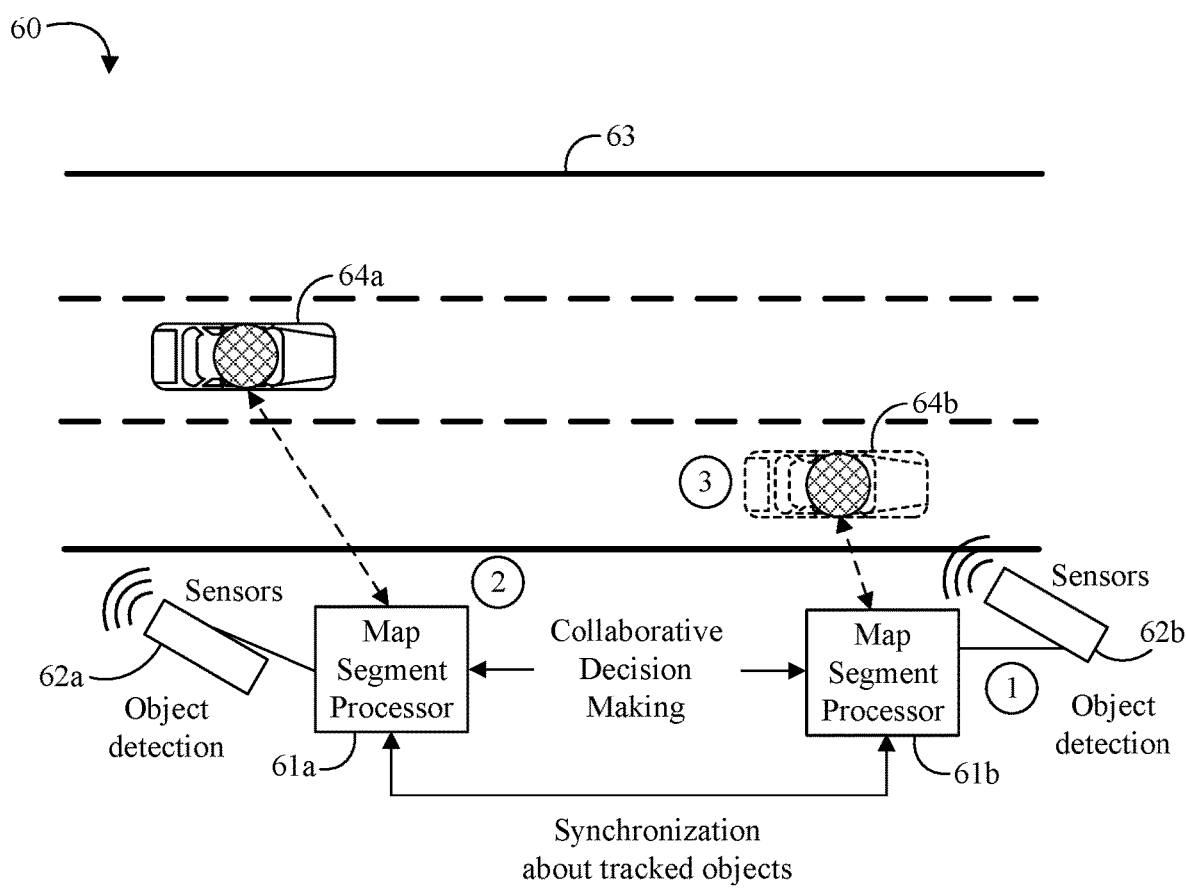
FIG. 6 is an illustrative diagram of an example of an environment according to an embodiment.

Turning now to FIG. 6, an embodiment of an environment 60 may include a system of sensors, compute units, and wireless communication technology. A plurality of map segment processors 61a, 61b may be communicatively coupled to a plurality of sensors 62a, 62b positioned along a section of road 63. One or more vehicles 64a, 64b may be travelling on the road 63. The vehicles 64a, 64b may include wireless communication technology to communicate with the map segment processors 61a, 61b. The sensor 62a may provide object detection information to the map segment processor 61a, while the sensor 62b may provide object detection information to the map segment processor 61b (e.g., via radar, ultrasonic, camera, etc.). The map segment processors 61a, 61b may exchange information about the vehicles 64a, 64b that they are tracking and may support collaborative decision making.

Handshake Between Car and Infrastructure Examples

In some embodiments, object annotation may be facilitated by a handshake protocol between vehicles and infrastructure at road sector entry only, where each car receives a system wide identifier (ID). For example, an initial handshake between a car and the infrastructure may happen when the car is passing by components of the infrastructure for the first time (e.g., when entering through an intersection or onto a roadway).

Figure 7:
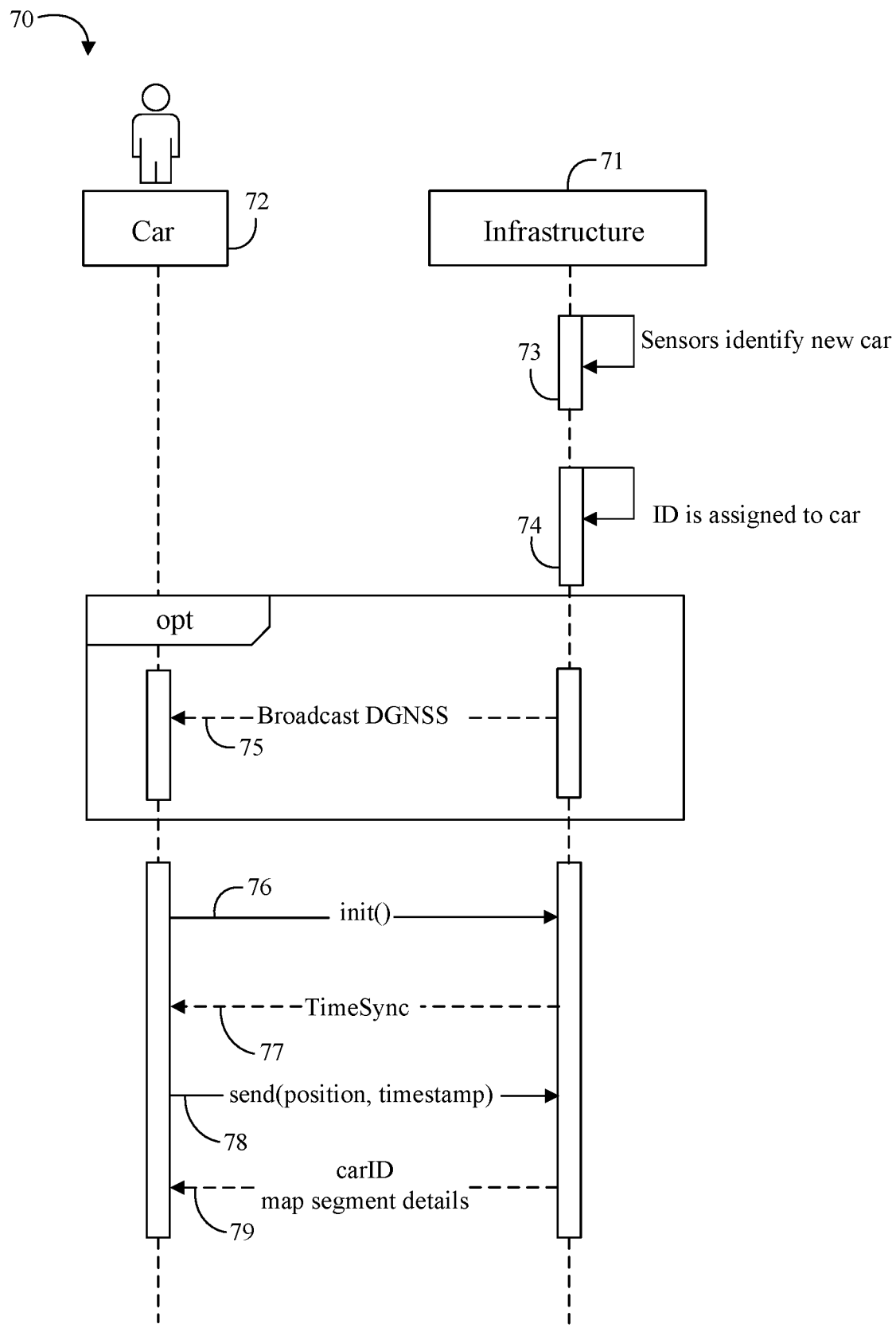
FIG. 7 is a process flow diagram of an example of a method of performing a handshake between an infrastructure and a car according to an embodiment.

Turning now to FIG. 7, an embodiment of method 70 of performing a handshake between an infrastructure 71 and a car 72 may include the infrastructure 71 identifying the car 72 as new to the infrastructure 71 at point 73, and generating a unique ID for the car at point 74. For example, the car ID may be reused once the car 72 leaves the region of the sensors of the infrastructure 71. The car ID may only need to be unique in the scope of the infrastructure 71 or a portion of the infrastructure 71. In some embodiments, the infrastructure 71 may optionally provide a service to improve the positioning information of the car 72 (e.g., utilizing differential global navigation satellite system (DGNSS)) at point 75. The car 72 may establish a connection to the infrastructure using a V2X protocol and may announce its intention to use maps data by sending a request package at point 76. A time sync may happen between the car 72 and the infrastructure 71 at point 77, where the infrastructure 71 may be the time authority. The car 72 may then submit its current position and timestamp back to the infrastructure 71 at point 78. To complete the handshake, the infrastructure 71 may send back the car ID assigned to that car 72 at point 79. Following the handshake, stationary sensors may be used to track the car 72 and update its position constantly while travelling on the highway.

In some embodiments, the handshake may optionally be repeated periodically or after a certain number of infrastructure nodes are passed to calibrate the tracking by the infrastructure sensors. In some embodiments, privacy concerns may be addressed by randomly changing the car IDs during each handshake. For example, DSRC or LTE V2X protocols may be used for the exchange. Following the handshake, the combination of location information from the vehicle and the consecutive vehicle tracking using sensor data from the infrastructure may be used to update the environmental map. Some embodiments may provide consecutive transmission of map data occurring as one-way communication or broadcast from the infrastructure to the cars, advantageously reducing or minimizing latency in the wireless information exchange.

For example, some embodiments may assign car IDs by utilizing universally unique identifier (UUID) techniques. For example, some embodiments may manage unique IDs with object tracking techniques such as a Kalman Filter or Gaussian Mixture Model. Some object tracking techniques may use IDs to track detected object in video or similar sensor data (e.g., a Kalman filter). Some embodiments may include a table or buffer as a storage that may be used to map the inherent IDs from the tracking technique to the unique car IDs used in the map broadcast.

Sensor Detection, Data Fusion and Map Generation Examples

Figure 8:
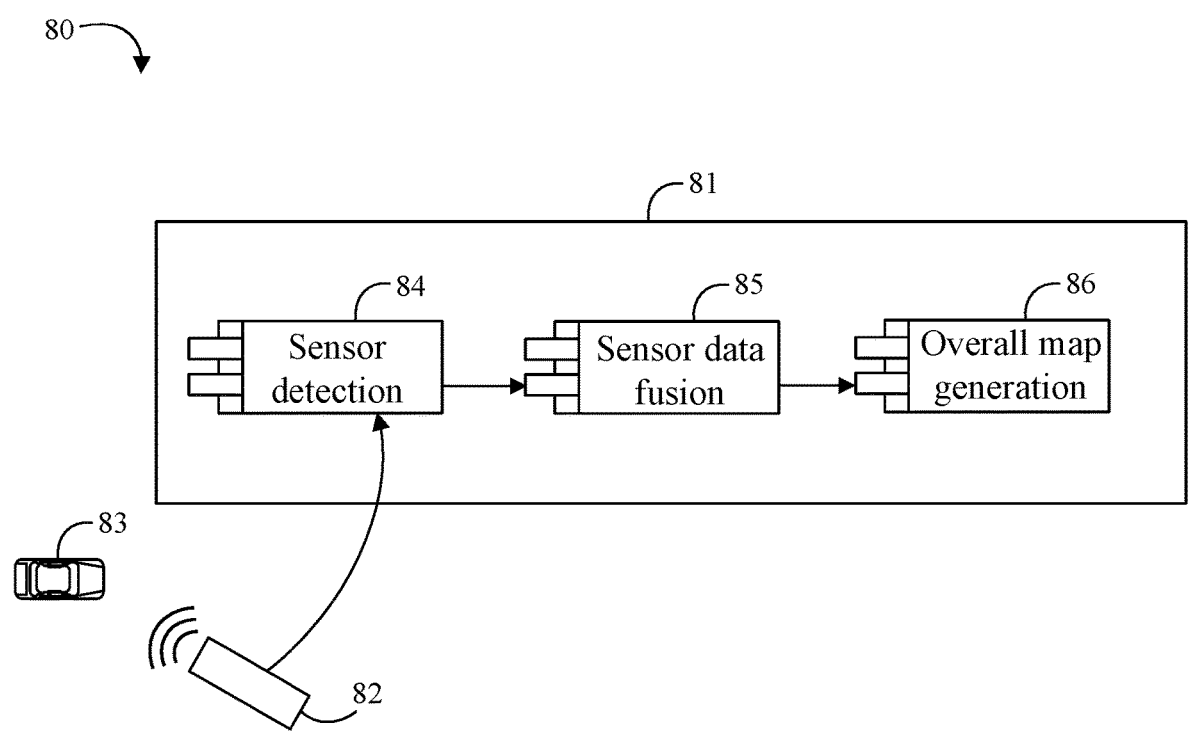
FIG. 8 is an illustrative diagram of an example of another environment according to an embodiment.

Turning now to FIG. 8, an embodiment of an environment 80 may include a roadside unit 81 communicatively coupled to a sensor 82 configured to detect an object 83 in the environment 80. Some embodiments of logical steps for generating an overall map of the traffic situation may include sensor detection at block 84, followed by sensor data fusion at block 85, followed by overall map generation at block 86. Any suitable technology may be used to generate a bird's eye view map of the environment. Stationary sensors suitable for detecting moving vehicles may be deployed along the road in a way such that few or no blind spots may remain under all traffic conditions. Some embodiments may attempt to achieve as complete as possible/practical coverage by combining different sensor types, sensor positions and sensing directions. By mounting the sensors stationary along the road, most constraints that might exist inside a car do not necessarily apply to the roadside sensors (e.g., weight constraints, space constraints, power consumption constraints, etc.). The relative movement between cars and the roadside sensors may further help to remove blind spots. For example, while traffic is passing by stationary sensors the sensors may have constantly changing viewing angles on passing objects (e.g., as opposed to the case for sensors mounted inside a moving car where objects traveling near the car may be at the same or similar speeds).

Figure 9A:
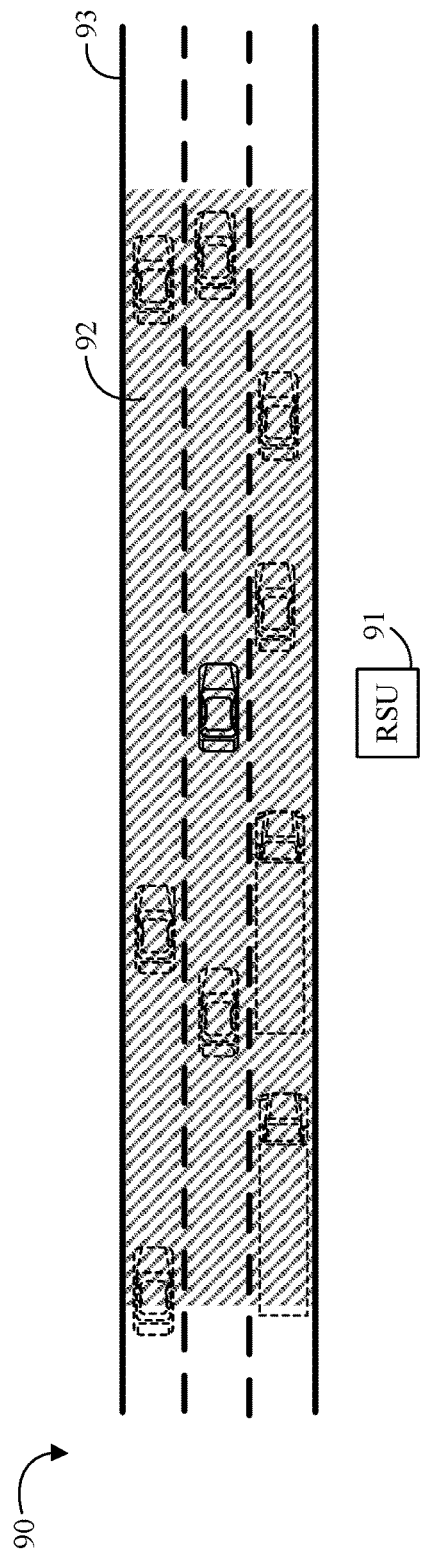
FIGS. 9A to 9B are illustrative representations of a bird's eye view map according to an embodiment.

Turning now to FIG. 9A, an embodiment of an illustrative representation of a bird's eye view map 90 shows how a first RSU 91 may provide coverage for a first sector 92 of a portion of a road 93. Sensor data may be fused using any suitable technique (e.g., a combination of Kalman filters). The data fusion may also involve a time synchronization. Information about location, direction, speed and size of each traffic participant may be extracted and combined to one overall map including all moving objects on the road that are in the detection range of the sensor directly connected to the compute unit. The result may be represented as the bird's eye view map 90, where the sector 92 of the road may be mapped by stationary sensors along the road of one compute unit (e.g., RSU 91).

Figure 9B:
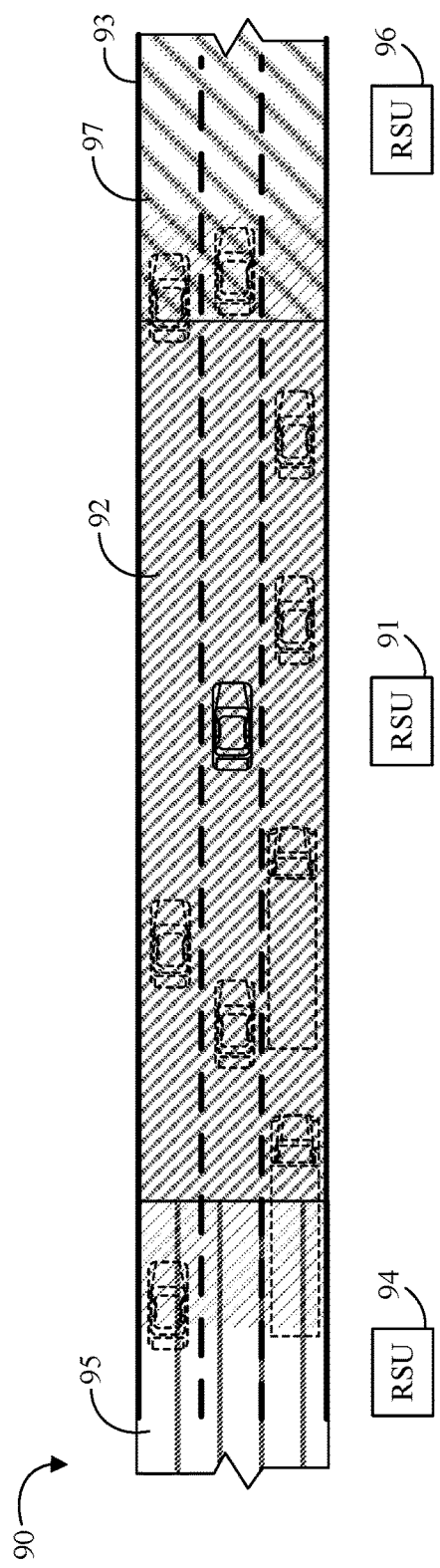

Turning now to FIG. 9B, an embodiment of another illustrative representation of the bird's eye view map 90 shows how a second RSU 94 may provide coverage for a second sector 95 of a portion of the road 93, and a third RSU 96 may provide coverage for a third sector 97 of a portion of the road 93. The second sector 95 may partially overlap with the first sector 92 at one end of the first sector 92, while the third sector 97 may partially overlap with the first sector 92 at the other end of the first sector 92. For example, there may be about 2 km between the RSUs and about 50 m between roadside sensors managed by each RSU (e.g., about 40 roadside sensors per RSU). By deploying consecutive infrastructure nodes in a way that their sensor coverage has partial overlap, some embodiments may create a continuous and substantially complete map of the road 93. For example, the RSUs 91, 94, and 96 may provide three consecutive infrastructure nodes for three sensing areas.

Individualized Map Segments Generation Examples

In some embodiments, communication of the environment model from the infrastructure to the cars may be broadcast-only to improve dependability and latency, and to improve or optimize the communication capacity used. Continuity of sensoric range may be derived from a wireless communication range overlap between infrastructure sectors. In some embodiments, wireless communication may use sidelink direct communication to deliberately limit transmission range per sector. The environmental model may be represented as a highly dynamic map which may be divided into segments and broadcast to the cars. The received map segments may be concatenated by the cars to achieve an improved or optimal visibility range while staying consistent with the overall map. Augmenting the in-car information with the map segments may save compute capacity for doing other in-car sensor fusion and object detection.

After the RSU has generated the overall map for its sector, one environmental map exists per infrastructure node and the sector maps have a partial overlap. Some embodiments may support the generation of individualized maps for each vehicle on the road. Advantageously, some embodiments may avoid sending information such as position, speed, direction, and size for each object multiple times, may avoid the exchange of such information between infrastructure nodes which may lead to communication delays, and may provide substantially constant visibility to the back and front of each object while passing between infrastructure nodes.

Figure 10:
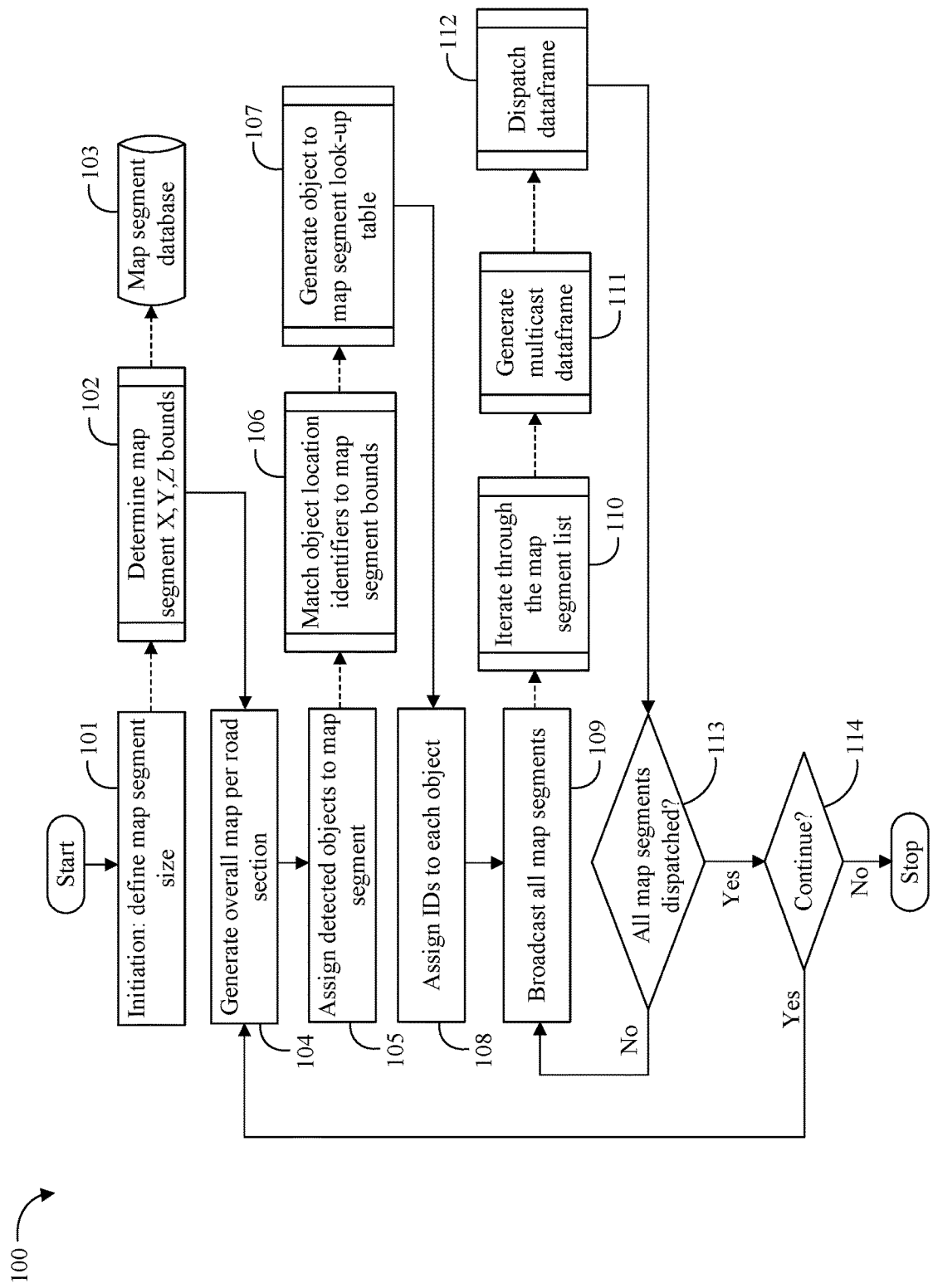
FIG. 10 is a flowchart of an example of a method of generating and broadcasting map segments according to an embodiment.
Figure 11:
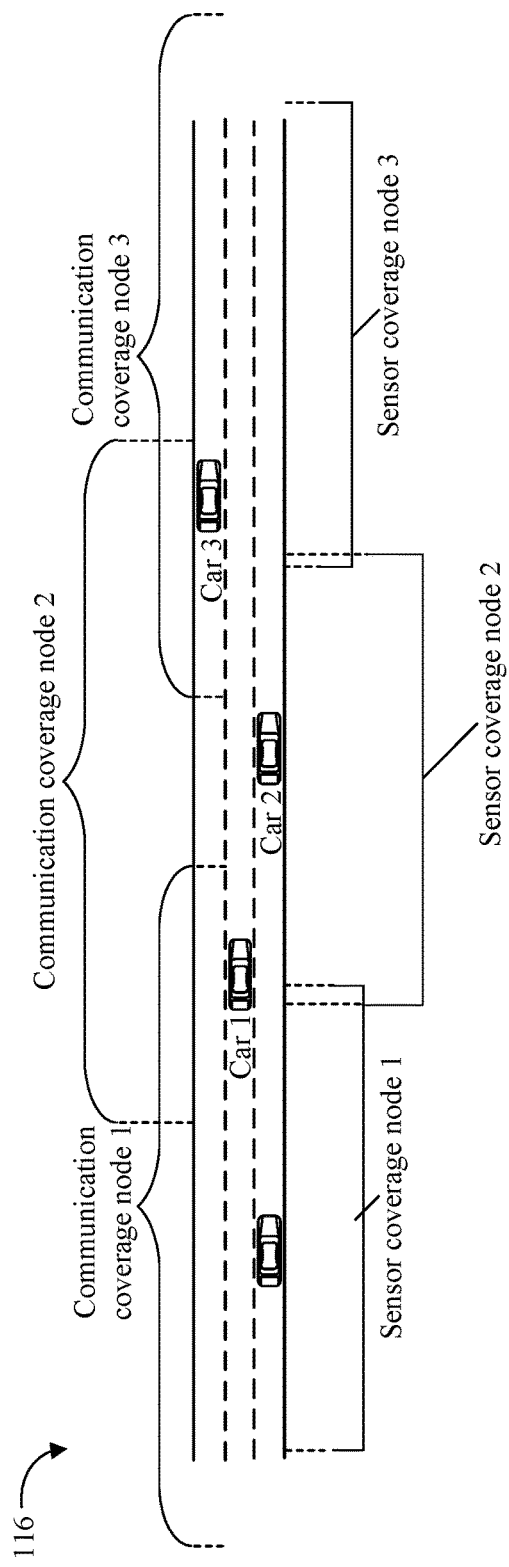
FIG. 11 is an illustrative diagram of an example of another environment according to an embodiment.

Turning now to FIG. 10, an embodiment of a method 100 of generating and broadcasting map segments may first presume that the wireless communication antennas that transmit data to the cars have overlapping transmission regions between infrastructure nodes (e.g., see FIG. 11). During initiation, the method 100 may define a map segment size at block 101, and determine the map segment X, Y, and Z bounds at block 102. The map segment information may be stored in a map segment database at block 103. For each infrastructure node, map segments of a few meters may be defined inside the road sector that is covered by that node's sensors. For example, inside a 2 km road sector, 100 map segments may be defined with a map segment size of 20 m in length. The map segments may be continuously numbered globally for all infrastructure nodes.

An overall map may be generated from sensor input at block 104, and after each overall map generation cycle the identified objects on the road may be clustered and assigned to their map segments at block 105. For example, the method 100 may match the object location identifiers to the map segment bounds at block 106, and generate an object to map segment look-up table at block 107. Each car's individual ID may be assigned as additional attribute to the map segment at block 108. The method 100 may then start broadcasting all map segments at block 109. For example, the method 100 may iterate through the map segment list at block 110, generate a multicast dataframe at block 111, and dispatch the dataframe at block 112. If all map segments are not dispatched at block 113, the method 100 may continue broadcasting map segments at block 109. For example, All infrastructure nodes may transmit all map segments with their object data after each sensing/map generation cycle sequentially. If all map segments are determined to be dispatched at block 113, the method 100 may continue at block 104 until a determination is made to stop at block 114.

Turning now to FIG. 11, an embodiment of an environment 116 may include a plurality of cars travelling past infrastructure nodes 1, 2, and 3. Rectangular brackets may indicate illustrative sensor coverage and curly brackets may indicate illustrative communication coverage per infrastructure node. For example, the wireless communication antennas in the infrastructure nodes that transmit data to the cars may have overlapping transmission regions between infrastructure nodes. The sensor coverage for the infrastructure nodes may also overlap.

Figure 12:
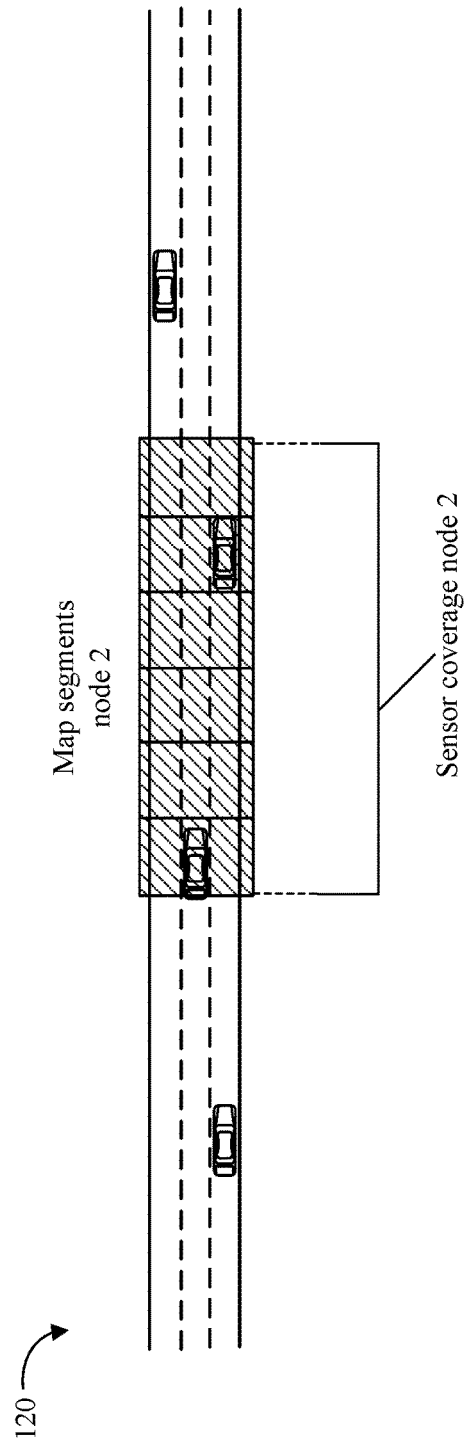
FIG. 12 is an illustrative representation of an environmental map according to an embodiment.

Turning now to FIG. 12, an embodiment of an illustrative map 120 may show segmentation of maps generated for one infrastructure node. For example, infrastructure node 2 may divide its covered road sector into multiple consecutive map segments. Although not illustrated, infrastructure nodes 1 and 3 may perform similar segmentation of maps generated for their respective road sector coverage.

Figure 13:
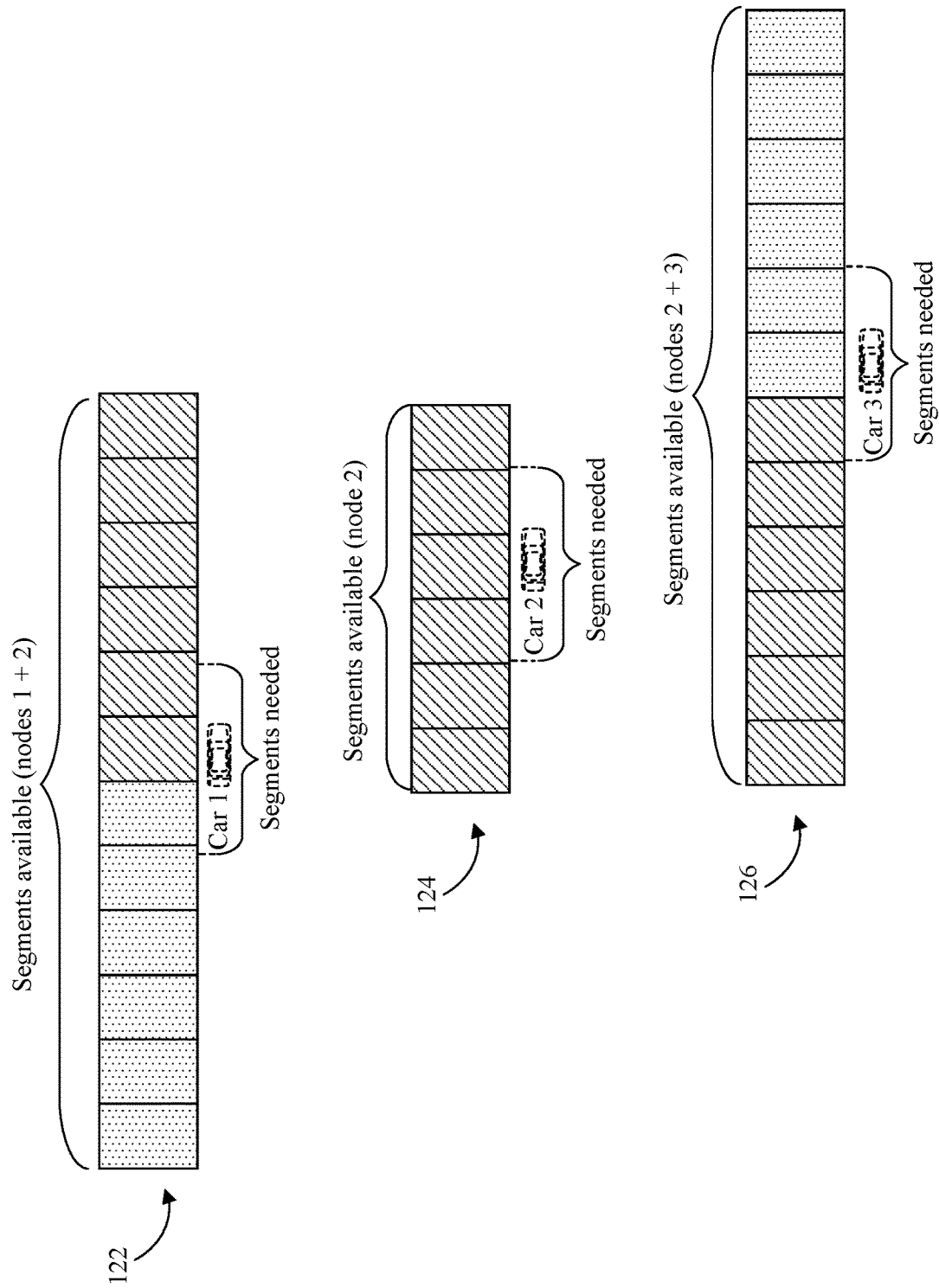
FIG. 13 is an illustrative representation of individualized maps according to an embodiment.

Turning now to FIG. 13, an embodiment of illustrative individualized maps 122, 124, and 126 for cars 1, 2, and 3, respectively, show how each car may construct an individualized map from broadcast map segments in accordance with some embodiments. Because of limited transmission range, each car may receive a limited number of broadcast map segment messages. While a car is passing the sensors of one infrastructure node, it may only receive map segments from that node and either the previous or the next node. While the number of available map segments may vary, each car may receive a sufficient number of needed segments to construct a custom map to help the car navigate. Each car may identify the map segment it is positioned in by looking up its own ID. From this identified ego-segment, each car may quickly concatenate its individual map by combining a desired number N of the previous and M of the next consecutive map segments (e.g., where N and M may be based on a desired individual map size). Advantageously, each car may build varying map sizes with different observation ranges according to each car's capabilities (e.g., compute power, memory capacity, power consumption, etc.).

Because the cars may receive map segment information from more than one infrastructure node at the same time, there may advantageously be no information gap when passing between nodes. The overlap in sensing area between nodes may be used to hand over the individual car tracking IDs between nodes. Advantageously, a precise time sync and minimal information exchange may happen between infrastructure nodes. Alternatively, in some embodiments, the handshake described above in connection with FIG. 7 may be repeated at each infrastructure node.

Figure 14:
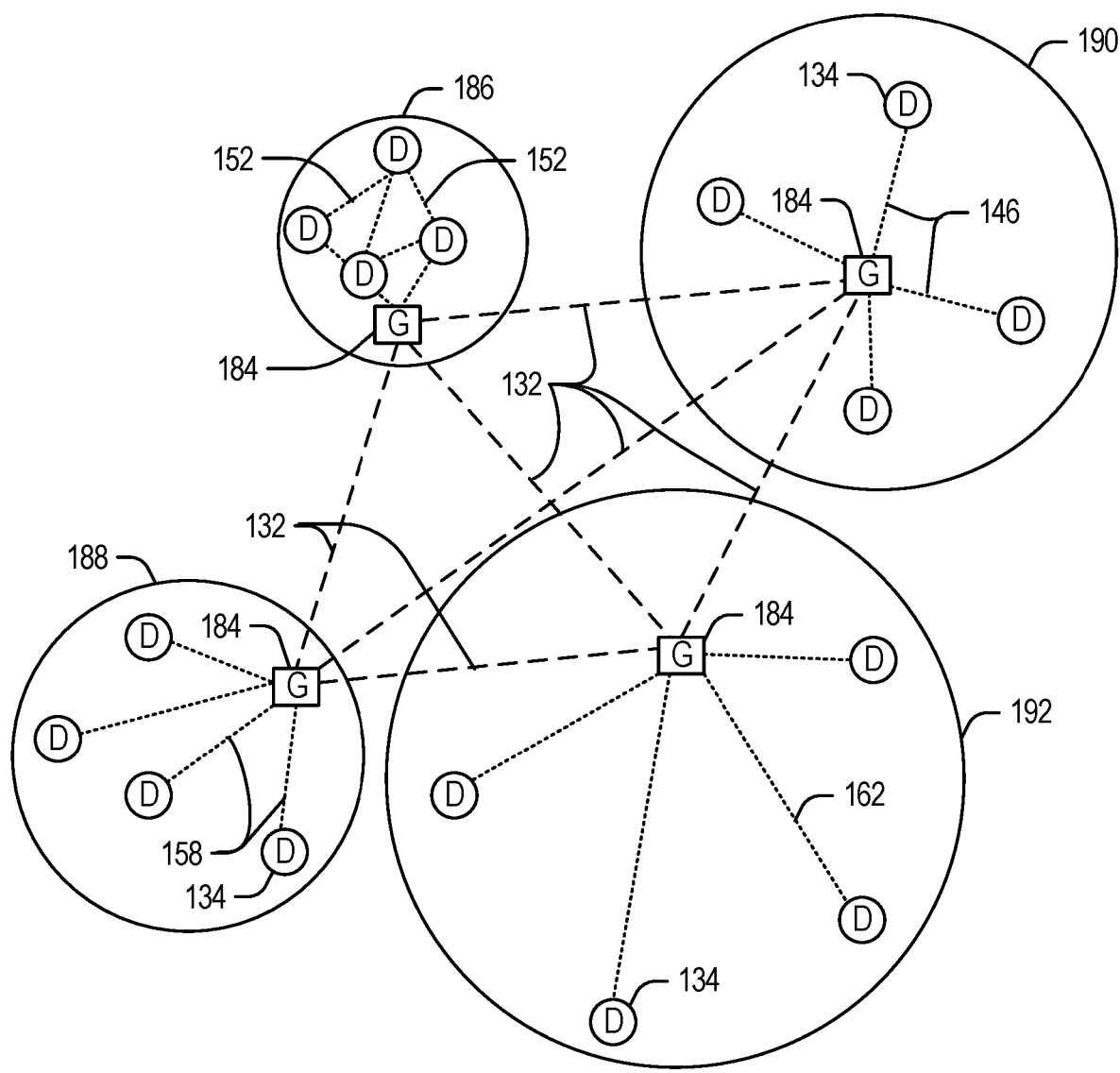
FIG. 14 illustrates a domain topology for respective internet-of-things (IoT) networks coupled through links to respective gateways, according to an example.

FIG. 14 illustrates an example domain topology for respective internet-of-things (IoT) networks coupled through links to respective gateways. For example, the domain topology of FIG. 14 may be representative of one type of network that may be used to provision and/or provide supporting information to the various embodiments described herein. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 15:
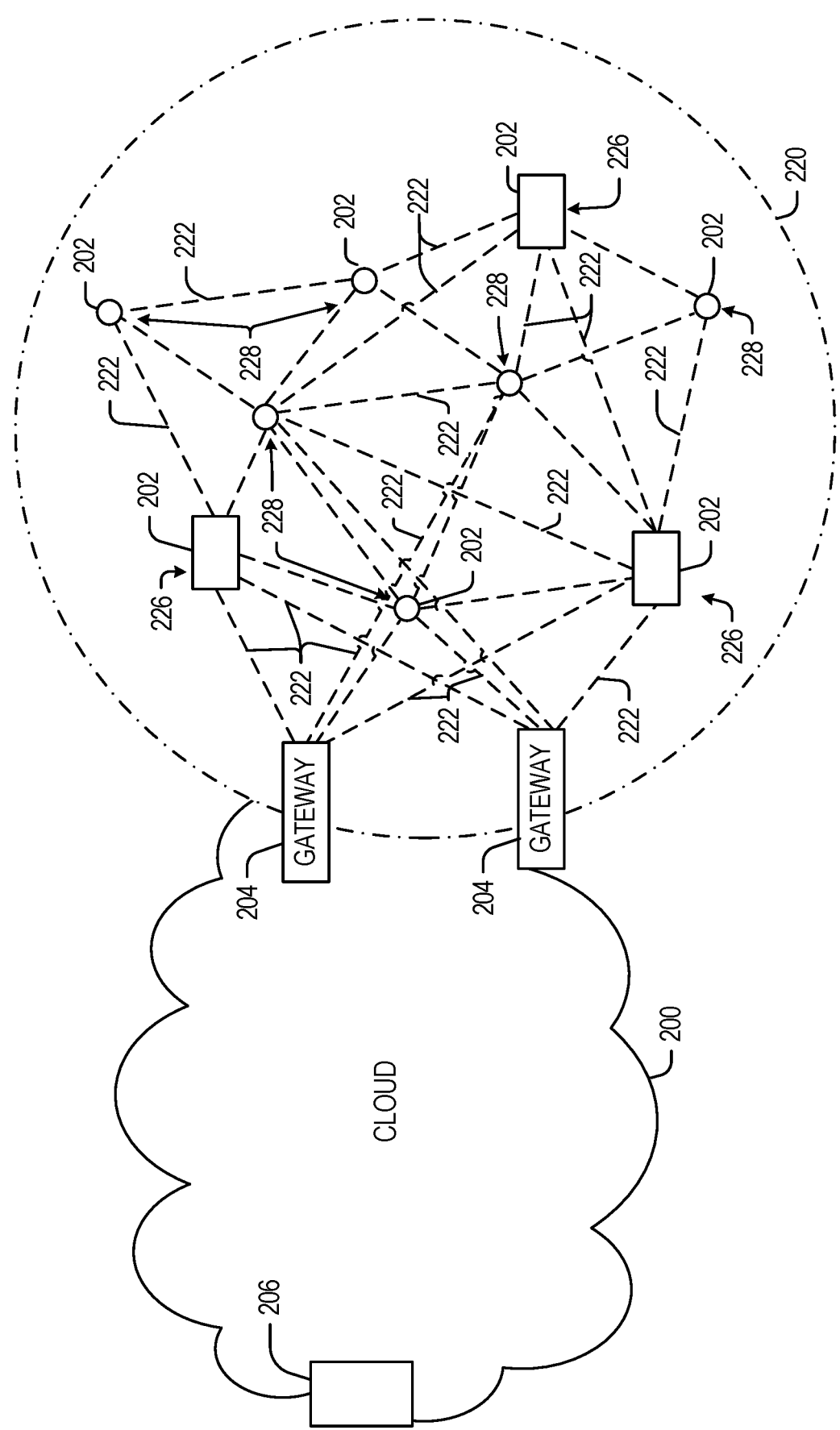
FIG. 15 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 14 and 15, present a number of new challenges in a heterogeneous network of connectivity comprising a combination of wired and wireless technologies.

FIG. 14 specifically provides a simplified drawing of a domain topology that may be used for a number of internet-of-things (IoT) networks comprising IoT devices 134, with the IoT networks 186, 188, 190, 192, coupled through backbone links 132 to respective gateways 184. For example, a number of IoT devices 134 may communicate with a gateway 184, and with each other through the gateway 184. To simplify the drawing, not every IoT device 134, or communications link (e.g., link 146, 152, 158, or 162) is labeled. The backbone links 132 may include any number of wired or wireless technologies, including optical networks, and may be part of a local area network (LAN), a wide area network (WAN), or the Internet. Additionally, such communication links facilitate optical signal paths among both IoT devices 134 and gateways 184, including the use of MUXing/deMUXing components that facilitate interconnection of the various devices.

The network topology may include any number of types of IoT networks, such as a mesh network provided with the network 186 using Bluetooth low energy (BLE) links 152. Other types of IoT networks that may be present include a wireless local area network (WLAN) network 188 used to communicate with IoT devices 134 through IEEE 802.11 (Wi-Fi®) links 158, a cellular network 190 used to communicate with IoT devices 134 through an LTE/LTE-A (4G) or 5G cellular network, and a low-power wide area (LPWA) network 192, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 134, such as over the backbone links 132, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 186, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 188, for instance, may use systems that perform standards conversion to provide multi-standard connectivity, enabling IoT devices 134 using different protocols to communicate. Further systems may provide seamless interconnectivity across a multi-standard infrastructure comprising visible Internet resources and hidden Internet resources.

Communications in the cellular network 190, for instance, may be enhanced by systems that offload data, extend communications to more remote devices, or both. The LPWA network 192 may include systems that perform non-Internet protocol (IP) to IP interconnections, addressing, and routing. Further, each of the IoT devices 134 may include the appropriate transceiver for wide area communications with that device. Further, each IoT device 134 may include other transceivers for communications using additional protocols and frequencies. This is discussed further with respect to the communication environment and hardware of an IoT processing device depicted in FIGS. 16 and 17.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 15 below.

FIG. 15 illustrates a cloud computing network in communication with a mesh network of IoT devices (devices 202) operating as a fog device at the edge of the cloud computing network. For example, the cloud/edge computing network of FIG. 15 may be representative of one type of network that may be used to provision and/or provide supporting information to the various embodiments described herein. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above with reference to FIGS. 1 to 13 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 16:
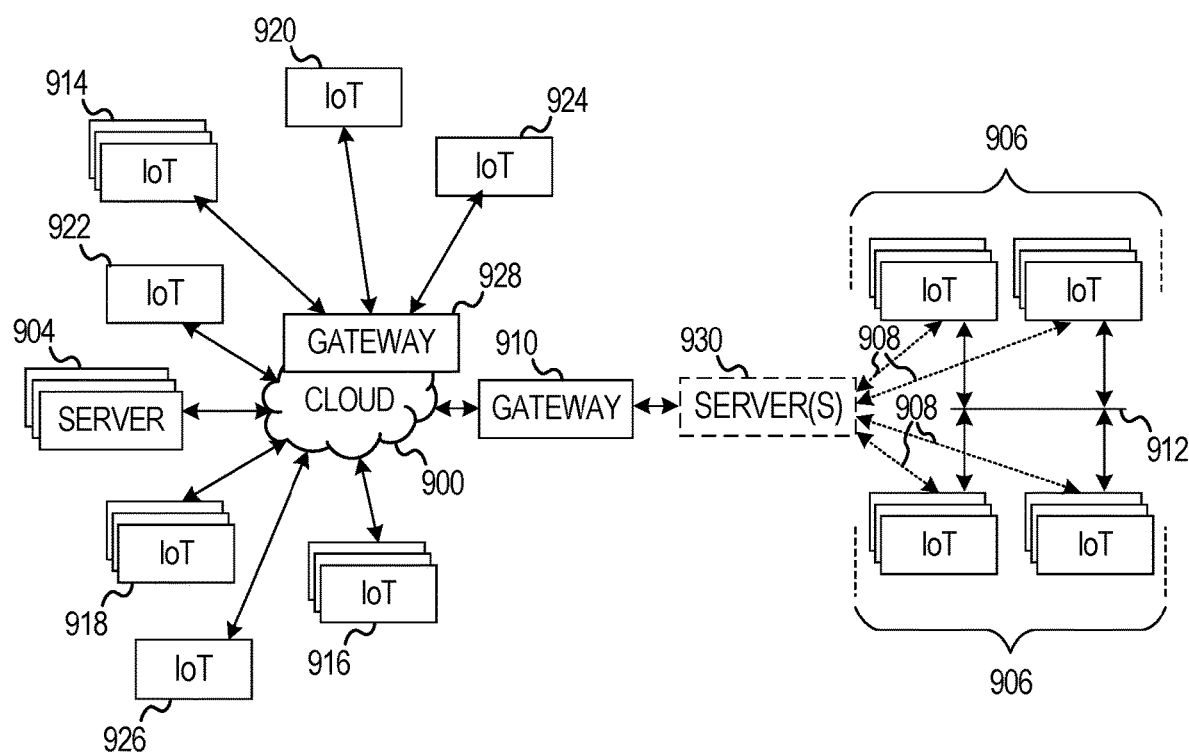
FIG. 16 illustrates a block diagram of a network illustrating communications among a number of IoT devices, according to an example.

FIG. 16 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. For example, the cloud/IoT computing network of FIG. 16 may be representative of one type of network that may be used to provision and/or provide supporting information to the various embodiments described herein. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 15), or a combination therein. The groups of IoT devices may be deployed in various residential, commercial, and industrial settings (including in both private or public environments).

As can be seen from FIG. 16, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 15).

Figure 17:
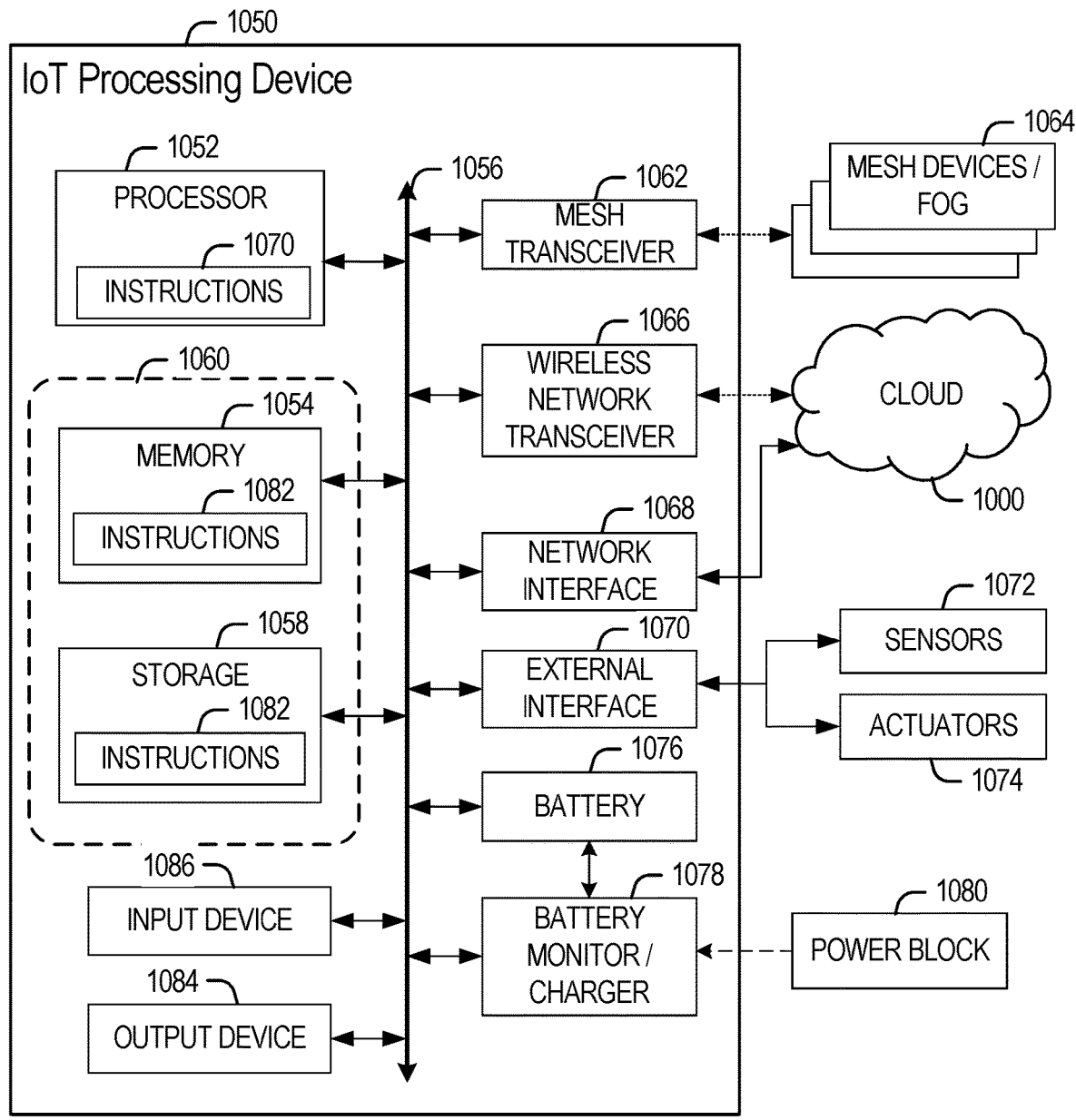
FIG. 17 illustrates a block diagram for an example IoT processing system architecture upon which any one or more of the techniques (e.g., operations, processes, methods, and methodologies) discussed herein may be performed, according to an example.

FIG. 17 is a block diagram of an example of components that may be present in an IoT device 1050 for implementing the techniques described herein. For example, the components of the IoT device 1050 and other components of FIG. 17 may be representative of the types of components that may be found in autonomous vehicles, stationary units, RSUs, and/or map segment broadcasters according to the various embodiments described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 17 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, etc. In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 17 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Additional Notes and Examples:

Example 1 may include an electronic processing system, comprising a processor, memory communicatively coupled to the processor, and logic communicatively coupled to the processor to establish communication between a first stationary unit and one or more vehicles, combine sensor data from the first stationary unit and at least one source outside the first stationary unit, generate an environmental map based on the combined sensor data, divide the environmental map into two or more map segments, and broadcast the two or more map segments.

Example 2 may include the system of Example 1, wherein the logic is further to establish communication between the first stationary unit and a second stationary unit with sidelink direct communication.

Example 3 may include the system of any of Examples 1 to 2, wherein the logic is further to annotate the two or more map segments with information for the one or more vehicles to construct respective individualized environmental maps.

Example 4 may include the system of Example 3, wherein the logic is further to assign a unique identifier to each of the one or more vehicles.

Example 5 may include the system of Example 3, wherein the logic is further to assign a unique identifier to each of the two or more map segments corresponding to a location in the environmental map.

Example 6 may include the system of Example 3, wherein the logic is further to cluster the one or more vehicles into the two or more map segments based on respective locations of the one or more vehicles and respective locations of the two or more segments in the environmental map.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to establish communication between a first stationary unit and one or more vehicles, combine sensor data from the first stationary unit and at least one source outside the first stationary unit, generate an environmental map based on the combined sensor data, divide the environmental map into two or more map segments, and broadcast the two or more map segments.

Example 8 may include the apparatus of Example 7, wherein the logic is further to establish communication between the first stationary unit and a second stationary unit with sidelink direct communication.

Example 9 may include the apparatus of any of Examples 7 to 8, wherein the logic is further to annotate the two or more map segments with information for the one or more vehicles to construct respective individualized environmental maps.

Example 10 may include the apparatus of Example 9, wherein the logic is further to assign a unique identifier to each of the one or more vehicles.

Example 11 may include the apparatus of Example 9, wherein the logic is further to assign a unique identifier to each of the two or more map segments corresponding to a location in the environmental map.

Example 12 may include the apparatus of Example 9, wherein the logic is further to cluster the one or more vehicles into the two or more map segments based on respective locations of the one or more vehicles and respective locations of the two or more segments in the environmental map.

Example 13 may include a method of communicating between a stationary unit and a vehicle, comprising establishing communication between a first stationary unit and one or more vehicles, combining sensor data from the first stationary unit and at least one source outside the first stationary unit, generating an environmental map based on the combined sensor data, dividing the environmental map into two or more map segments, and broadcasting the two or more map segments.

Example 14 may include the method of Example 13, further comprising establishing communication between the first stationary unit and a second stationary unit with sidelink direct communication.

Example 15 may include the method of any of Examples 13 to 14, further comprising annotating the two or more map segments with information for the one or more vehicles to construct respective individualized environmental maps.

Example 16 may include the method of Example 15, further comprising assigning a unique identifier to each of the one or more vehicles.

Example 17 may include the method of Example 15, further comprising assigning a unique identifier to each of the two or more map segments corresponding to a location in the environmental map.

Example 18 may include the method of Example 15, further comprising clustering the one or more vehicles into the two or more map segments based on respective locations of the one or more vehicles and respective locations of the two or more segments in the environmental map.

Example 19 may include at least one computer readable medium, comprising a set of instructions, which when executed by a computing device, cause the computing device to establish communication between a first stationary unit and one or more vehicles, combine sensor data from the first stationary unit and at least one source outside the first stationary unit, generate an environmental map based on the combined sensor data, divide the environmental map into two or more map segments, and broadcast the two or more map segments.

Example 20 may include the at least one computer readable medium of Example 19, comprising a further set of instructions, which when executed by the computing device, cause the computing device to establish communication between the first stationary unit and a second stationary unit with sidelink direct communication.

Example 21 may include the at least one computer readable medium of any of Examples 19 to 20, comprising a further set of instructions, which when executed by the computing device, cause the computing device to annotate the two or more map segments with information for the one or more vehicles to construct respective individualized environmental maps.

Example 22 may include the at least one computer readable medium of Example 21, comprising a further set of instructions, which when executed by the computing device, cause the computing device to assign a unique identifier to each of the one or more vehicles.

Example 23 may include the at least one computer readable medium of Example 21, comprising a further set of instructions, which when executed by the computing device, cause the computing device to assign a unique identifier to each of the two or more map segments corresponding to a location in the environmental map.

Example 24 may include the at least one computer readable medium of Example 21, comprising a further set of instructions, which when executed by the computing device, cause the computing device to cluster the one or more vehicles into the two or more map segments based on respective locations of the one or more vehicles and respective locations of the two or more segments in the environmental map.

Example 25 may include a map segment broadcaster apparatus, comprising means for establishing communication between a first stationary unit and one or more vehicles, means for combining sensor data from the first stationary unit and at least one source outside the first stationary unit, means for generating an environmental map based on the combined sensor data, means for dividing the environmental map into two or more map segments, and means for broadcasting the two or more map segments.

Example 26 may include the apparatus of Example 25, further comprising means for establishing communication between the first stationary unit and a second stationary unit with sidelink direct communication.

Example 27 may include the apparatus of any of Examples 25 to 26, further comprising means for annotating the two or more map segments with information for the one or more vehicles to construct respective individualized environmental maps.

Example 28 may include the apparatus of Example 27, further comprising means for assigning a unique identifier to each of the one or more vehicles.

Example 29 may include the apparatus of Example 27, further comprising means for assigning a unique identifier to each of the two or more map segments corresponding to a location in the environmental map.

Example 30 may include the apparatus of Example 27, further comprising means for clustering the one or more vehicles into the two or more map segments based on respective locations of the one or more vehicles and respective locations of the two or more segments in the environmental map.

Example 31 may include a stationary processing system, comprising a processor memory communicatively coupled to the processor a power subsystem coupled to the processor and the memory a radio subsystem communicatively coupled to the processor and the power subsystem one or more antennas communicatively coupled to the radio subsystem a sensor subsystem communicatively coupled to the processor and the power subsystem, and a map segment broadcaster communicatively coupled to the processor, the power subsystem, and the sensor subsystem, the map segment broadcaster including one or more of configurable logic and fixed function logic to establish communication between the stationary processing system and one or more vehicles combine sensor data from the sensor subsystem and at least one source outside the stationary processing system generate an environmental map based on the combined sensor data divide the environmental map into two or more map segments, and broadcast the two or more map segments with the radio subsystem.

Example 32 may include the system of Example 31, wherein the map segment broadcaster includes further logic to perform a handshake between the stationary processing system and the one or more vehicles to establish communication.

Example 33 may include the system of Example 31, wherein the map segment broadcaster includes further logic to combine one or more of location, direction, speed and size information for each of the one or more vehicles.

Example 35 may include the system of Example 31, wherein the map segment broadcaster includes further logic to divide the environmental map into two or more map segments based on a sensor coverage area.

Example 36 may include the system of Example 31, wherein the map segment broadcaster includes further logic to establish communication between the stationary processing system and another nearby stationary processing system with sidelink direct communication.

Example 37 may include the system of Example 31, wherein the map segment broadcaster includes further logic to annotate the two or more map segments with information for the one or more vehicles to construct respective individualized environmental maps.

Example 38 may include the system of Example 37, wherein the map segment broadcaster includes further logic to assign a unique identifier to each of the one or more vehicles.

Example 39 may include the system of Example 37, wherein the map segment broadcaster includes further logic to assign a unique identifier to each of the two or more map segments corresponding to a location in the environmental map.

Example 40 may include the system of Example 37, wherein the map segment broadcaster includes further logic to cluster the one or more vehicles into the two or more map segments based on respective locations of the one or more vehicles and respective locations of the two or more segments in the environmental map.

Example 41 may include the system of Example 37, wherein the map segment broadcaster includes further logic to assign a unique identifier to each of the one or more vehicles, and annotate the two or more map segments with the unique identifier for the one or more vehicles to construct respective individualized environmental maps.

Example 42 may include the system of any of Examples 31 to 41, further comprising one or more substrates, wherein the map segment broadcaster logic is coupled the one or more substrates.

Example 43 may include the system of Example 42, wherein the map segment broadcaster logic coupled to the one or more substrates includes transistor channel regions that are positioned within the one or more substrates.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic to be operated by the processor to:
establish communication between a first stationary unit and one or more vehicles,
combine sensor data from the first stationary unit and at least one source outside the first stationary unit, the at least one source being a vehicle of the one or more vehicles or a second stationary unit,
generate an environmental map based on the combined sensor data,
divide the environmental map into two or more map segments,
annotate the two or more map segments with information for the one or more vehicles for respective local construction of individualized environmental maps at the one or more vehicles, and
broadcast a message to the one or more vehicles, the message including the two or more map segments and the annotations.

2. The system of claim 1, wherein the logic is further to:
establish communication between the first stationary unit and the second stationary unit with sidelink direct communication.

3. The system of claim 1, wherein the logic is further to perform a handshake procedure with the one or more vehicles during which the logic operated by the processor is to:
assign a unique identifier (ID) to respective vehicles of the one or more vehicles;
establish the communication between the first stationary unit and the respective vehicles;
perform a time synchronization with the respective vehicles; and
provide the assigned ID to the respective vehicles.

4. The system of claim 3, wherein the logic is further to:
assign a unique ID to each of the two or more map segments corresponding to a location in the environmental map; and
assign the respective vehicles to respective map segments using the unique IDs assigned to the respective vehicles and the unique ID assigned to each map segment.

5. The system of claim 4, wherein the information for the one or more vehicles to construct respective individualized environmental maps includes the assignment of respective vehicles to the respective map segments.

6. The system of claim 3, wherein the logic is further to:
cluster the one or more vehicles into the two or more map segments based on respective locations of the one or more vehicles and respective locations of the two or more segments in the environmental map.

7. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
establish communication between a first stationary unit and one or more vehicles,
combine sensor data from the first stationary unit and at least one source outside the first stationary unit, the at least one source being a vehicle of the one or more vehicles or a second stationary unit,
generate an environmental map based on the combined sensor data,
divide the environmental map into two or more map segments,
annotate the two or more map segments with information for construction by the one or more vehicles of respective individualized environmental maps, and
broadcast a message to the one or more vehicles, the message including the two or more map segments and the annotations.

8. The apparatus of claim 7, wherein the logic is further to:
establish communication between the first stationary unit and the second stationary unit with sidelink direct communication.

9. The apparatus of claim 7, wherein the logic is further to perform a handshake procedure with the one or more vehicles during which the logic is to:
assign a unique identifier (ID) to respective vehicles of the one or more vehicles;
establish the communication between the first stationary unit and the respective vehicles;
perform a time synchronization with the respective vehicles; and
provide the assigned ID to the respective vehicles.

10. The apparatus of claim 9, wherein the logic is further to:
  assign a unique ID to each of the two or more map segments corresponding to a location in the environmental map; and
  assign the respective vehicles to respective map segments using the unique IDs assigned to the respective vehicles and the unique ID assigned to each map segment.

11. The apparatus of claim 10, wherein the information for the one or more vehicles to construct respective individualized environmental maps includes the assignment of respective vehicles to the respective map segments.

12. The apparatus of claim 9, wherein the logic is further to:
  cluster the one or more vehicles into the two or more map segments based on respective locations of the one or more vehicles and respective locations of the two or more segments in the environmental map.

13. A method of communicating between a stationary unit and a vehicle, comprising:
  establishing communication between a first stationary unit and one or more vehicles;
  combining sensor data from the first stationary unit and at least one source outside the first stationary unit, the at least one source being a vehicle of the one or more vehicles or a second stationary unit;
  generating an environmental map based on the combined sensor data;
  dividing the environmental map into two or more map segments;
  annotating the two or more map segments with information for the one or more vehicles to construct respective individualized environmental maps; and
  broadcasting a message to the one or more vehicles, the message including the two or more map segments and the annotations.

14. The method of claim 13, further comprising:
  establishing communication between the first stationary unit and the second stationary unit with sidelink direct communication.

15. The method of claim 13, further comprising:
  assigning a unique identifier (ID) to respective vehicles of the one or more vehicles;
  establishing the communication between the first stationary unit and the respective vehicles;
  performing a time synchronization with the respective vehicles; and
  providing the assigned ID to the respective vehicle.

16. The method of claim 15, further comprising:
  assigning a unique ID to each of the two or more map segments corresponding to a location in the environmental map; and
  assign the respective vehicles to respective map segments using the unique IDs assigned to the respective vehicles and the unique ID assigned to each map segment.

17. The method of claim 16, wherein the information for the one or more vehicles to construct respective individualized environmental maps includes the assignment of respective vehicles to the respective map segments.

18. The method of claim 15, further comprising:
  clustering the one or more vehicles into the two or more map segments based on respective locations of the one or more vehicles and respective locations of the two or more segments in the environmental map.

19. At least one non-transitory computer readable medium (NTCRM) comprising instructions, wherein execution of the instructions by a computing device is to cause the computing device to:
  establish communication between a first stationary unit and one or more vehicles;
  combine sensor data from the first stationary unit and at least one source outside the first stationary unit, the at least one source being a vehicle of the one or more vehicles or a second stationary unit;
  generate an environmental map based on the combined sensor data;
  divide the environmental map into two or more map segments;
  annotate the two or more map segments with information for the one or more vehicles for respective local construction of individualized environmental maps at the one or more vehicles; and
  broadcast a message to the one or more vehicles, the message including the two or more map segments and the annotations.

20. The at least one NTCRM of claim 19, wherein execution of the instructions is further to cause the computing device to:
  establish communication between the first stationary unit and the second stationary unit with sidelink direct communication.

21. The at least one NTCRM of claim 19, wherein execution of the instructions is further to cause the computing device to:
  assign a unique identifier (ID) to respective vehicles of the one or more vehicles;
  establish the communication between the first stationary unit and the respective vehicles;
  perform a time synchronization with the respective vehicles; and
  provide the assigned ID to the respective vehicles.

22. The at least one NTCRM of claim 21, wherein execution of the instructions is further to cause the computing device to:
  assign a unique ID to each of the two or more map segments corresponding to a location in the environmental map; and
  assign the respective vehicles to respective map segments using the unique IDs assigned to the respective vehicles and the unique ID assigned to each map segment.

23. The at least one NTCRM of claim 21, wherein the information for the one or more vehicles to construct respective individualized environmental maps includes the assignment of respective vehicles to the respective map segments.

24. The at least one NTCRM of claim 21, wherein execution of the instructions is further to cause the computing device to:
  cluster the one or more vehicles into the two or more map segments based on respective locations of the one or more vehicles and respective locations of the two or more segments in the environmental map.

* * * * *